United States Patent [19]

Gall

[11] 4,008,199
[45] Feb. 15, 1977

[54] HEAT STABILIZED POLYALKYLENE TEREPHTHALATE RESIN COMPOSITION

[75] Inventor: John S. Gall, North Haledon, N.J.

[73] Assignee: Celanese Corporation, New York, N.Y.

[22] Filed: June 9, 1975

[21] Appl. No.: 584,800

[52] U.S. Cl. .................. 260/40 R; 260/45.95 D; 260/857 PE; 260/860

[51] Int. Cl.² .......................................... C08K 3/40

[58] Field of Search .......... 260/857 PE, 860, 40 R, 260/45.95 D

[56] References Cited

UNITED STATES PATENTS

| | | | |
|---|---|---|---|
| 3,224,973 | 12/1965 | Knapp | 260/45.95 D X |
| 3,329,740 | 7/1967 | Battersby | 260/860 |
| 3,367,870 | 2/1968 | Spivack | 260/45.95 D X |
| 3,480,569 | 11/1969 | Chappelear et al. | 260/40 R X |
| 3,480,695 | 11/1969 | Hale | 260/860 |
| 3,644,279 | 2/1972 | Mathis et al. | 260/45.8 N |
| 3,790,648 | 2/1974 | Schmidt et al. | 260/45.95 D X |
| 3,814,725 | 6/1974 | Zimmerman et al. | 260/40 R |
| 3,903,042 | 9/1975 | Gall | 260/857 PE X |
| 3,920,602 | 11/1975 | Freed | 260/857 R X |

Primary Examiner—Donald E. Czaja
Assistant Examiner—S. M. Person
Attorney, Agent, or Firm—Linn T. Grim; Marvin Bressler; T. J. Morgan

[57] ABSTRACT

The long term heat stabilized polyalkylene terephthalate resin composition comprises a polyalkylene terephthalate resin selected from the group consisting of polypropylene terephthalate and polybutylene terephthalate, 2 to 60 percent of the total composition of a reinforcing filler and stabilizing amounts of the combination of polyamide polymer, phenoxy resin and an organic phosphonate. The composition retains a higher degree of tensile strength after high temperature long-term aging than does any polyalkylene terephthalate composition of the prior art.

7 Claims, No Drawings

HEAT STABILIZED POLYALKYLENE TEREPHTHALATE RESIN COMPOSITION

BACKGROUND OF THE DISCLOSURE

1. Field of the Invention

The invention is directed to a heat stabilized thermoplastic polyester molding resin. The instant invention is directed to a long term heat stabilized polyalkylene terephthalate resin composition. More specifically, the instant invention is directed to a long term heat stabilized polyalkylene terephthalate composition consisting of a polyalkylene terephthalate resin, a reinforcing filler and stabilizing amounts of the combination of polyamide polymer, phenoxy resin and an organic phosphonate.

2. Description of the Prior Art

The surprisingly superior results attainable by employing a reinforced polyalkylene terephthalate resin selected from the group consisting of polypropylene terephthalate and polybutylene terephthalate as a molding resin has recently been recognized in the art such as U.S. Pat. No. 3,814,725. These superior results include improved moldability as well as improved properties of the reinforced polyalkylene terephthalate molded article.

As is well known in the art, reinforced polypropylene terephthalate and polybutylene terephthalate can be molded and otherwise processed at lower temperatures and have a significantly shorter cycle time in the mold than reinforced polyethylene terephthalate. More importantly, these resins do not require, as does reinforced polyethylene terephthalate, the presence of a nucleating agent to induce crystallinity. It has recently been discovered that nucleating agents and/or internal mold release agents when added to reinforced polypropylene terephthalate or reinforced polybutylene terephthalate molding resins cause a marked decrease in surface quality i.e., the glossy surface finished on products molded therefrom is rendered rough, streaky and uneven. Thus, polypropylene terephthalate and polybutylene terephthalate polymers which were first disclosed, along with polyethylene terephthalate in U.S. Pat. No. 2,465,319 to Whinfield and Dickson have been long associated with polyethylene terephthalate and believed, by those skilled in the art, to be equivalent with all polyalkylene terephthalates.

The other area of superior results attained by reinforced polypropylene terephthalate and polybutylene terephthalate compared to molding resins of the prior art, and especially reinforced polyethylene terephthalate, is the noticeably improved performance properties of the molded articles made of these resins. For example, reinforced polybutylene terephthalate resins although possessing equivalent strength compared to an equivalent reinforced polyethylene terephthalate resin has substantially higher toughness, lower water absorption, better creep properties and more desirable color properties than does an equivalently filled polyethylene terephthalate resin.

The above improved results attained with reinforced polypropylene terephthalate and polybutylene terephthalate compared to equivalent molding resins of the prior art as exemplified by polyethylene terephthalate explain the recent explosive growth in the use of these thermoplastic polyesters. A fundamental property necessary to further expansion in the utilization of these resins is tensile strength retention after long term exposure to high temperatures. This property is fundamental to the utilization of polypropylene terephthalate and polybutylene terephthalate in many applications requiring high strength properties.

Certain molded articles not only require high tensile strength but furthermore require that the molded article retain its strength even under long exposure to high temperatures. As those skilled in the art are aware, thermoplastic molding resins in general lose a considerable percentage of their tensile strength when exposed to high temperature over extended periods of time. This is true of polypropylene terephthalate and polybutylene terephthalate. Thus, although the addition of reinforcing fillers raise the tensile strength of these resins to a point where they became utilizable as engineering resins, still the problem of high temperature stability limits their utilization and bars their use in many important applications. For instance, there are many articles disposed under the hood of automobiles, which when fabricated of polypropylene terephthalate or polybutylene terephthalate represent an advance over the materials of construction currently employed. An example of such an article is a distributor cap. A distributor cap molded of glass reinforced polybutylene terephthalate has superior electrical properties compared to the thermoset distributor caps of the prior art. However, a problem associated with a glass reinforced polybutylene terephthalate distributor cap lies in the loss of tensile strength with time due to the high temperatures existing under the automobile hood.

The problem of heat stabilization of polypropylene terephthalate and polybutylene terephthalate has already been considered in the prior art. However, one is always looking for improvements in heat stabilization for longer periods of time so as to supply molding resins maintaining physical and chemical properties after long term exposure to elevated temperatures.

SUMMARY OF THE INVENTION

The present invention is directed to an improved polyalkylene terephthalate resin composition which overcomes some of the disadvantages of the polyalkylene terephthalate resin compositions of the prior art. That is, the polyalkylene terephthalate resin composition of the present invention has increased high temperature tensile strength stability compared to the resin compositions of the prior art.

In accordance with the instant invention a polyalkylene terephthalate resin composition which consists of the group consisting of polypropylene terephthalate and polybutylene terephthalate includes polypropylene terephthalate or polybutylene terephthalate in combination with a reinforcing filler which comprises about 2 to 60 weight percent of the total composition and containing stabilizing amounts of the combination of polyamide polymer, phenoxy resin and an organic phosphonate.

DETAILED DESCRIPTION

The base of the resins of this invention is a polyalkylene terephthalate polymer selected from the group consisting of polypropylene terephthalate and polybutylene terephthalate. These polymers which are the general type described in U.S. Pat. No. 2,465,319 to Whinfield and Dickson, can be produced from the reaction product of a dibasic acid, such as terephthalic acid or a dialkyl ester of terephthalic acid (especially dimethyl terephthalate), and diols having 3 and 4 carbon atoms. Suitable diols include 1,3-propanediol, and 1,4-butanediol.

In the production of the polymers used in this invention, i.e., polypropylene or polybutylene terephthalate, the appropriate bis-(hydroxyalkyl) terephthalate is produced as the intermediate. The bis-(hydroxyalkyl) terephthalate can be prepared by reacting the dialkyl ester of terephthalic acid in which the alkyl radicals can contain from 1 to 7 carbon atoms with about two molecular proportions of the diols described above.

The reaction for the esterification is conducted under conditions of elevated temperatures and atmospheric, subatmospheric or superatmospheric pressure. Normally, the desired temperatures of the reaction can range from about the melting temperature of the reaction mixture to as high as 250° C., if desired.

After the polymer base is prepared, other additives for appearance and property improvements can be incorporated into the molding resins of this invention such as colorants, hardeners, flame retardants, reinforcing agents and the like by intimately blending by either dry blending or melt blending, blending in extruders, heated rolls or other types of mixers.

The range of intrinsic viscosity of the polyproplene terephthalate and polybutylene terephthalate molding resins of this invention is between about 0.4 and 1.2 deciliters per gram. More preferably, the intrinsic viscosity is in the range of between about 0.5 and 1.0 deciliters per gram as measured in a 8 percent solution, based on the polymer weight, of ortho-chlorophenol at 25° C.

The improved polypropylene terephthalate or polybutylene terephthalate resin composition of this invention includes a reinforcing filler. The reinforcing filler, in one preferred embodiment, is charged into the polymerization reaction with the monomers. This latter preferred embodiment is employed only in those cases where the polymerization reaction is not affected by the presence of the reinforcing filler. A preferred reinforcing filler is glass fibers which may be introduced into the composition as chopped or continuous rovings. Other preferred fillers include asbestos fibers, cotton fabric paper, synthetic fibers, and the like. The amount of reinforcing filler ranges between about 2 and 60 weight percent of the total composition. More preferably, the amount of reinforcing filler is in the range of between about 5 and 50 weight percent of the total composition.

To achieve the improved long term heat stabilized compositions of this invention, stabilizing amounts of the combination of the additives of polyamide polymer, a phenoxy resin and an organic phosphonate are incorporated into reinforced polypropylene terephthalate or polybutylene terephthalate molding resins as described above. The amounts of each of the additives can range from about 0.01 to about 10 weight percent of the total molding composition preferably from about 0.1 to about 2 weight percent of the total composition.

The linear polyamide as utilized herein is meant to include synthetic linear polyamides which can be prepared from polyamide forming monomers such as monoaminocarboxylic acids, their amide-forming derivatives, or from suitable diamines and suitable dicarboxylic acids or amide-forming derivatives of these compounds. The polyamides produced having recurring amide groups as an integral part of the main polymer chain and the recurring intra-linear carbonamide groups in these polyamides are separated by hydrocarbon groups containing at least two carbon atoms. Synthetic linear polyamides which can be prepared according to the method of this this invention are all those of the nylon type having a relative viscosity between 35 and 100, and preferably between 45 and 65, as measured in a solution of 2 grams of the polyamide in 21.8 grams of a 90 percent formic acid solution.

Preparation of such polymers is typically illustrated in U.S. Pat. Nos. 2,071,200; 2,071,253; 2,130,948; 2,285,009; 2,361,717; 2,512,606; 3,193,535; and 3,431,236 among others.

Particular polyamides which can be prepared according to the method of this invention include, among others, polyhexamethylene adipamide, polyhexamethylene sebacamide, polymerized 6-aminocaproic acid, polytetramethylene adipamide, polytetramethylene sebacamide, and polyadipamides prepared from di (4-aminocyclohexyl) ethane or 1,6-di(4-aminocyclohexyl) hexane as the diamine component.

The preferred polyamides used in this invention include: nylon 6, nylon 66, nylon 610, nylon 11 and nylon 12. These are commercially available polymers and their methods of preparation are described in the Encyclopedia of Chemical Technology, vol. 10, pages 924–928, Interscience Publishers Inc., N.Y.C. (1953). Other polyamides which fall within the ambit of this invention include both those made from amino acids or the corresponding alicyclic lactams as well as those made from salts of diamines and dibasic acids. The most preferred polyamide is nylon 6, polymerized caprolactam.

The phenoxy resins utilized herein are high molecular weight thermoplastic resins which are produced from 2,2-bis (4-hydroxyphenyl) propane and epichlorohydrin according to the procedure as described in U.S. Pat. No. 3,356,646 issued Dec. 5, 1967. The basic chemical structure of the phenoxy resins is similar to that of epoxy resins. They are, however, a separate and unique resin class, differing from epoxies in several important characteristics:

1. Phenoxy resins are tough and ductile thermoplastics. Their average molecular weight ranges from 15,000 to 75,000 preferably from 20,000 to 50,000 compared with 340 to 13,000 for conventional epoxies which cross link on polymerization.

2. Phenoxy resins do not have terminal highly reactive epoxy groups and are thermally stable materials with a long shelf life.

3. The phenoxy resins can be used without further chemical conversion. They require no catalysts, curing agents or hardeners to be useful products while epoxy resins require catalysts, curing agents or hardeners to be useful. The phenoxy resins utilized herein can be characterized by a repeating structure:

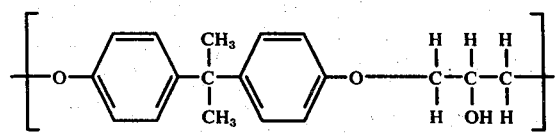

and having an average molecular weight range from about 15,000 to 75,000. As is obvious, the terminal structure is completed with hydrogen atoms or suitable end capping groups.

The organic phosphonate which can be utilized in this invention are described in U.S. Pat. No. 3,367,870. They have the following formula:

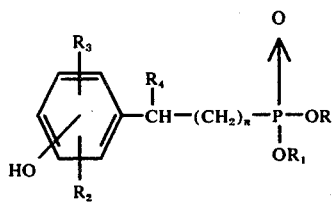

wherein $n$ is 0 or 1 and a. when n is 1, each of R and $R_1$ is alkyl, preferably alkyl groups having from 12 to 24 carbon atoms, examples of useful alkyl groups represented by R and $R_1$ being methyl, ethyl isopropyl, propyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, heneicosyl, docosyl, tricosyl, tetracosyl, and the like.

$R_2$ and $R_3$ each independently represents alkyl, eg., alkyl having from 1 to 18 carbon atoms, especially tertiary butyl; examples of useful alkyl groups being methyl, ethyl, propyl, isopropyl, butyl, secondary butyl, tertiary butyl, pentyl, hexyl, heptyl, octyl, nonyl, decyl, undecyl, dodecyl, tridecyl, tetradecyl, pentadecyl, hexadecyl, heptadecyl, octadecyl, and the like; and b. when $n$ is 0

$R_2$ and OH and $R_3$ are fixed respectively, in the 3, 4 and 5 positions of the benzene ring portion of the benzylphosphonate.

each of R and $R_1$ is higher alkyl of from 14 to 30 carbon atoms, preferably 14 to 22; particularly R and $R_1$ may be the same or different alkyl groups but in any event will contain at least 14 carbon atoms; and representative of such higher alkyl groups are tetradecyl, pentadecyl, hexadecyl, heptadecyl, octadecyl, nonadecyl, eicosyl, heneicosyl, docosyl, and the like up to triacontyl;

$R_2$ is alkyl of 1 to 6 carbon atoms, and preferably a large bulky alkyl group such as a tertiarybutyl group;

$R_3$ is tertiary butyl; and $R_4$ is hydrogen or methyl.

The following compounds among others can be utilized:

Di-n-octadecyl 3-t-butyl-4-hydroxy-5-methylbenzylphosphonate,

Di-n-octadecyl 1-(3,5-di-t-butyl-4-hydroxyphenyl). ethanephosphonate,

Di-n-tetradecyl 3,5-di-t-butyl-4-hydroxybenzylphosphonate,

Di-n-hexadecyl 3,5-di-t-butyl-4-hydroxybenzylphosphonate,

Di-n-docosyl 3,5-di-t-butyl-4-hydroxybenzylphosphonate. The preferred stabilizer is di-n-octadecyl 3,5-di-t-butyl- 4-hydroxybenzylphosphonate.

The combination of stabilizing materials can be added to the reinforced polyester resin in a number of ways 1. by incorporating the stabilizers onto the reinforcing agent prior to its intimate blending with the polyester resins 2. by simultaneously intimate mixing with the reinforcing agent and the polyester resin 3. by blending with the polymer and then intimately blending with the reinforcing agents among other mixing techniques.

Other additives, such as flame retardants and the like may also be added to the composition of this invention.

The following examples are given to illustrate the polypropylene terephthalate and polybutylene terephthalate resin compositions of this invention. It should be appreciated that these examples are given for illustrative purposes only and should not be construed as limiting the invention thereto.

EXAMPLE I

Polybutylene terephthalate (PBT) having an intrinsic viscosity of 0.75 deciliter per gram in orthochlorophenol at 25° C., is tumble blended with ⅛ inch length reinforcing glass fiber in sufficient amounts to provide a 30 percent by weight of glass to the total molding composition. After the tumble blending, the mixture of glass fibers and 1,4-polybutylene terephthalate is extrusion blended by force feeding through a one inch single screw extruder with a standard die. The temperature of the extruder and die range from 500° F. to 510° F. The strands are chopped in the milling type mixer to pass through a large screen (4 mesh or smaller).

The extruded fiberglass reinforced polybutylene terephthalate polymer is formed into Type I tensile bars. The Type I tensile bars were produced on a Stokes screw injection machine under the following molding conditions:

| | |
|---|---|
| Nozzle | 510° C. |
| Barrel Cylinders | 500° F. |
| Melt Temperature | 500° F. |
| Mold Temperature | 150° F. |
| Injection (hydraulic) Pressure | 1500 psi. |
| Injection Cushion | ¼ inch |
| Screw Speed | 80 rpm. |
| Cycle | |
| Injection | 10 seconds |
| Hold | 15 seconds |
| Delay | 2 seconds |

EXAMPLE II

A polybutylene terephthalate melt containing 30 percent by weight of ⅛ inch glass fibers is prepared as described in Example I. In this batch, however, along with the glass fibers, 0.75 percent by weight, based on the weight of the total composition, of nylon 6 (polycaprolactam having a relative viscosity of 45) pellets is added. The addition of the nylon pellets occurs simultaneously with the addition of the glass fibers. It is emphasized, however, that the nylon may be added prior or subsequent to the addition of the glass fibers. The batch containing 0.75 percent by weight of the nylon pellets is fabricated into Type I tensile bars in accordance with the procedure enumerated in Example I.

EXAMPLE III

A batch of polybutylene terephthalate resin as described in Example II is prepared with the exception that in place nylon 6, a phenoxy resin as described above in the specification having an average molecular weight of approximately 30,000 (1.25 weight percent of the total composition) is added to the composition of Example I and the Type I tensile bars are produced.

EXAMPLE IV

In a similar manner as Example III above 0.1 weight percent (total composition) of di-n-octadecyl, 3,5-di-t-butyl-4-hydroxybenzylphosphonate is added in place of phenoxy resin.

EXAMPLE V

In a similar manner as Example III, above 0.75 weight percent nylon 6, having a relative viscosity of 45 and 1.25 weight percent of phenoxy resin as described in the specification having an average molecular weight of about 30,000 is added to the composition of Example I and the Type I tensile bars are produced.

EXAMPLE VI

In a similar manner as Example V, 0.1 weight percent di-n-octadecyl 3,5-di-t-butyl-4-hydroxybenzylphosphonate is substituted for the nylon 6 additive.

EXAMPLE VII

In a similar manner as Example V, an additional amount of 0.1 weight percent di-n-octadecyl, 3,5-di-t-butyl-4-hydroxybenzylphosphonate is added to the nylon resin and phenoxy resin.

SUMMARY OF AGING TENSILE RESULTS OF EXAMPLES I THROUGH VII

Numerous Type I tensile bars were formed from the compositions of Examples I through VII. The tensile strength of a sample of each of the bars was determined prior to their placement in aging ovens, some bars aged at 185° C. and some bars aged at 195° C. The tensile strength determination was conducted according to the procedure as described in ASTM D-638-68. Periodically, five bars of each of the compositions was removed from the ovens to determine the tensile strengths. For example samples for tensile strength determination were removed from the oven maintained at 185° C. at times of 1 week, 2 weeks, 3 weeks, 5 weeks, 7 weeks, 11 weeks, 15 weeks and 21 weeks intervals while the samples removed from the oven maintained at 195° C. were taken at intervals of 2 days, 4 days, 8 days, 2 weeks, 3 weeks, 5 weeks, 6 weeks, 8 weeks, and 10 weeks.

The tensile strengths of each of the bars of the compositions over this testing period were tabulated on a graph indicating tensile strength vs. time to determine at what period of time the tensile strength of each set of bars was reduced to 50 percent of its original value. This is designated the $F_{50}$ value. This gives an excellent indication of the long term stability of the various polyalkylene terephthalate resins to high heat exposure. The following results are indicated in Tables I and II.

Table I

| Example | $F_{50}$ Tensile Strength Values of Type I Tensile Bars aging at 185° C. | | |
|---|---|---|---|
| | Composition | Initial Tensile Strength psi. | $F_{50}$ Hours |
| I | 30% glass reinforced PBT | 13,200 | 1529 |
| II | " +0.75% nylon 6 | 15,900 | 1798 |
| IV | " +0.1% organic phosphonate | 17,200 | 1865 |
| V | " +1.25% phenoxy resin +0.75% nylon 6 | 16,900 | 2856 |
| VI | " +1.25% phenoxy resin +0.75% nylon 6 +0.1% organic phosphonate | 17,300 | 4032 |

The combination of phenoxy resin, nylon 6 and the organic phosphonate with 30% glass reinforced PBT is far superior in long term aging to any of the other combinations of the above described materials.

In regard to the data of Table I describing heat aging of tensile bars at 185° C., it can be concluded that the period of time needed to reduce the tensile strength of the aging bars to a 50 percent level of the original bar is significantly longer for the additive combination of phenoxy resin, nylon 6 resin and the organic phosphonate in glass reinforced polybutylene terephthalate (4032 hours) than any of the individual and combinations shown above. Thus the long term aging properties of the compositions of this invention are outstanding.

TABLE II

| Example | $F_{50}$ Tensile Strength Values of Type I Tensile Bars Aging at 195° C. | | |
|---|---|---|---|
| | Composition | Initial Tensile strength psi. | $F_{50}$ Hours |
| I | 30% glass reinforced PBT | 13,200 | 345 |
| II | " +0.75% nylon 6 resin | 15,900 | 379 |
| III | " +1.25%phenoxy resin | 17,000 | 586 |
| V | " +1.25% phenoxy resin +0.75% nylon 6 resin | 16,900 | 1345 |
| VI | " +1.25% phenoxy resin +0.1% organic phosphonate | 17,200 | 1035 |
| VII | " +1.25% phenoxy resin +0.75% nylon 6 resin +0.1% organic phosphonate | 17,300 | 1587 |

In regard to the data of Table II describing heat aging of tensile bars at 195° C. the same conclusion can be drawn as set forth for the data of Table I in regard to the combinations of phenoxy resin, nylon 6 resin and an organic phosphonate.

Similar results are obtainable if polypropylene terephthalate polymer are substituted for polybutylene terephthalate polymer in the examples as set forth in Tables I and II above.

What is claimed is:

1. In a molding resin comprising a reinforcing filler and a polyalkylene terephthalate selected from the group consisting of the polymer reaction product of 1,3-propanediol and terephthalic acid or dimethyl terephthalate and the polymer reaction product of 1,4-butanediol and terephthalic acid or dimethyl terephthalate, said polyalkylene terephthalate having an intrinsic viscosity in the range of about 0.4 to about 1.2 deciliters per gram, as measured in an 8 weight percent solution, based on the polymer weight, of orthochlorophenol at 25° C.; the improvement comprising an intimate blend of said molding resin and the combination of stabilizing amounts of additives of each of a. a linear polyamide polymer having a relative viscosity in the range from 35 to 100 b. a thermoplastic phenoxy resin having a repeating structure:

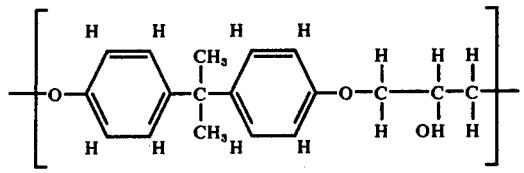

and an average molecular weight in a range from about 15,000 to about 75,000 c. an organic phosphonate of the formula:

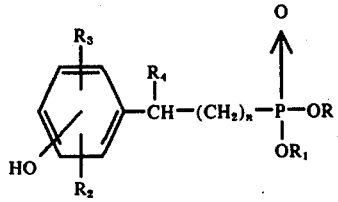

wherein $n$ is 0 or 1 and
a. when $n$ is 1, each of R and $R_1$ is alkyl having from 12 to 24 carbon atoms and each of $R_2$ and $R_3$ is alkyl having from 1 to 6 carbon atoms, and $R_4$ is hydrogen; and
b. when $n$ is 0,
$R_2$, OH and $R_3$ are fixed, respectively, in the 3, 4 and 5 positions of the benzene ring portion of the benzylphosphonate;
each of R and $R_1$ is alkyl of 14 to 30 carbon atoms,
$R_2$ is alkyl of from 1 to 6 carbon atoms,
$R_3$ is tertiary-butyl, and
$R_4$ is a member selected from the group consisting of hydrogen and methyl.

2. The composition of claim 1 wherein the polyalkylene terephthalate is the polymer reaction product of 1,4-butanediol and terephthalic acid or dimethyl terephthalate.

3. The composition of claim 2 wherein each of the combination of stabilizing amounts of additives range from about 0.01 to about 10 weight percent of the total molding compositions and the reinforcing filler ranges from about 2 to about 60 weight percent of the total molding composition.

4. The composition of claim 3 wherein each of the combination of stabilizing amounts of additives range from about 0.1 to about 2 weight percent of the total molding compositions, the reinforcing filler is glass fibers and the intrinsic viscosity of the polyalkylene terephthalate ranges from 0.5 to 1.0 deciliters per gram.

5. The composition of claim 4 wherein the linear polyamide polymer is polycarprolactam (nylon 6) having a relative viscosity in the range from about 45 to about 65.

6. The composition of claim 5 wherein the phenoxy resin has an average molecular weight ranging from about 20,000 to about 50,000.

7. The composition of claim 6 wherein the organic phosphonate is di-n-octadecyl 3,5-di-t-butyl-4-hydroxybenzylphosphonate.

* * * * *